United States Patent
Bai et al.

(10) Patent No.: US 8,514,322 B2
(45) Date of Patent: Aug. 20, 2013

(54) SYSTEMS AND METHODS FOR ADAPTIVE CONTROL AND DYNAMIC RANGE EXTENSION OF IMAGE SENSORS

(75) Inventors: Yingjun Bai, San Jose, CA (US); Xiangli Li, San Jose, CA (US)

(73) Assignee: Aptina Imaging Corporation, George Town, Grand Cayman (KY)

( * ) Notice: Subject to any disclaimer, the term of this patent is extended or adjusted under 35 U.S.C. 154(b) by 367 days.

(21) Appl. No.: 12/816,575

(22) Filed: Jun. 16, 2010

(65) Prior Publication Data
US 2011/0310278 A1 Dec. 22, 2011

(51) Int. Cl.
H04N 5/235 (2006.01)
G03B 7/00 (2006.01)
H04N 9/083 (2006.01)
H04N 3/14 (2006.01)
H04N 5/335 (2011.01)
H04N 9/04 (2006.01)

(52) U.S. Cl.
USPC ............... 348/362; 348/276; 348/277

(58) Field of Classification Search
USPC .............. 348/276–280, 222.1, 362, 364, 366
See application file for complete search history.

(56) References Cited

U.S. PATENT DOCUMENTS

| 7,915,576 B2 * | 3/2011 | Kanai et al. ............ 250/226 |
| 8,035,711 B2 * | 10/2011 | Liu et al. ............ 348/277 |
| 2006/0017829 A1 | 1/2006 | Gallagher |
| 2009/0059048 A1 * | 3/2009 | Luo et al. ............ 348/308 |
| 2010/0149393 A1 * | 6/2010 | Zarnowski et al. ............ 348/302 |
| 2010/0309333 A1 * | 12/2010 | Smith et al. ............ 348/230.1 |

* cited by examiner

*Primary Examiner* — Kelly L Jerabek
(74) *Attorney, Agent, or Firm* — Kramer Levin Naftalis & Frankel LLP

(57) ABSTRACT

Systems and methods are provided for obtaining adaptive exposure control and dynamic range extension of image sensors. In some embodiments, an image sensor of an image system can include a pixel array with one or more clear pixels. The image system can separately control the amount of time that pixels in different lines of the pixel array are exposed to light. As a result, the image system can adjust the exposure times to prevent over-saturation of the clear pixels, while also allowing color pixels of the pixel array to be exposed to light for a longer period of time. In some embodiments, the dynamic range of the image system can be extended through a reconstruction and interpolation process. For example, a signal reconstruction module can extend the dynamic range of one or more green pixels by combining signals associated with green pixels in different lines of the pixel array.

8 Claims, 6 Drawing Sheets

SYSTEMS AND METHODS FOR ADAPTIVE CONTROL AND DYNAMIC RANGE EXTENSION OF IMAGE SENSORS

FIELD OF THE INVENTION

The present invention is directed to systems and methods for providing adaptive exposure control and dynamic range extension of image sensors.

BACKGROUND OF THE DISCLOSURE

Image sensors are used in many different types of electronic devices to capture an image. For example, modern cameras (e.g., video cameras and digital cameras) and other image capturing devices use image sensors to capture an image.

Image sensors typically include a pixel array capable of converting light into an electrical charge. In some cases, the pixel array can include clear pixels that can be more sensitive to light. These clear pixels can be used to improve the imaging performance of an image sensor under low light conditions. Unfortunately, the high sensitivity of the clear pixels can also cause the clear pixels to be over-saturated when the pixel array is capturing an image under good lighting conditions.

DETAILED DESCRIPTION OF THE DISCLOSURE

Figure 1:
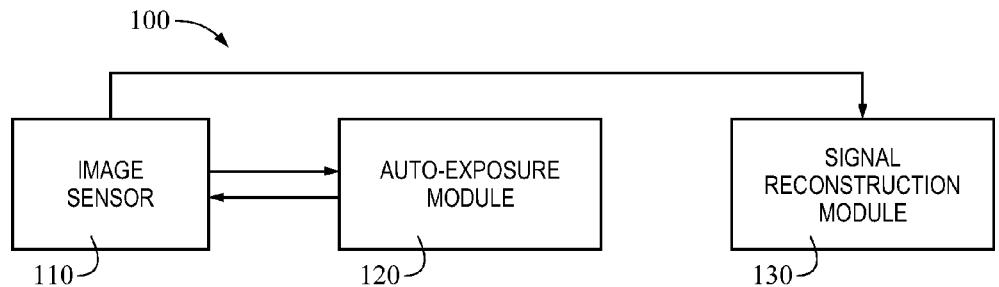
FIG. 1 is a schematic view of an illustrative image system configured in accordance with embodiments of the invention.

FIG. 1 is a schematic view of an illustrative image system configured in accordance with embodiments of the invention. Image system 100 can be any type of user device that utilizes an image sensor (embodied here as image sensor 110) and is controlled generally by control circuitry (not shown in FIG. 1). For example, image system 100 can include a camera, such as a computer camera, still camera, or portable video camera. Person skilled in the art will appreciate that image system 100 can include any other components in a typical camera (or otherwise), which are not depicted in FIG. 1 to avoid any distractions from embodiments of the invention.

Image sensor 110, which can include any combination of lenses and arrays of cells for capturing light, can be capable of capturing one or more signals corresponding to a streaming image. The array of cells of image sensor 110 can include any suitable devices or cells including, for instance, charge-coupled devices ("CCDs") and/or complementary metal oxide semiconductor ("CMOS") sensor cells. In some embodiments, the array of cells can be a pixel array, where each cell of the pixel array can be a pixel. As used herein, a "pixel" can refer to any cell that may include a photodiode and transistors capable of converting light to an electrical signal.

Image sensor 110 may be implemented using any suitable combination of hardware and software. For example, image sensor 110 may include one or more processors, microprocessors, ASICS, FPGAs, or any suitable combination of hardware and software. In some embodiments, image sensor 110 can be implemented substantially all in hardware (e.g., as a system-on-a-chip ("SoC")). This way, image sensor 110 can have a small design that minimizes the area occupied on image system 100. In addition, image sensor 110 may have circuit components designed to maximize the speed of operation.

In some embodiments, image sensor 110 can be capable of sensing color. For example, image sensor 110 can include a color filter array (not shown in FIG. 1) positioned over the surface of image sensor 110. In some cases, the color filters can be positioned over one or more color pixels of the pixel array. Portions of the color filter array can be coated with multiple color filters, where each color filter can allow specific wavelengths of light to enter the pixel array. The color filters can include any suitable color filters such as, for example, red, blue, green, cyan, magenta, and/or yellow color filters.

In some embodiments, the color filter array can include portions that are not coated with color filters. These portions of the color filter array can be positioned over one or more clear pixels of the pixel array. The clear pixels can be more sensitive to light as compared to color pixels, and use of the clear pixels can improve the imaging performance of image sensor 110. However, the sensitivity of the clear pixels can also cause early saturation of these pixels when image sensor 110 is capturing images under good lighting conditions. Thus, by using a pixel array with a particular arrangement and providing for adaptive exposure control of one or more pixels of a pixel array, image system 100 can simultaneously prevent early saturation of the clear pixels of the pixel array and introduce higher sensitivity to image sensor 110.

Figure 2:
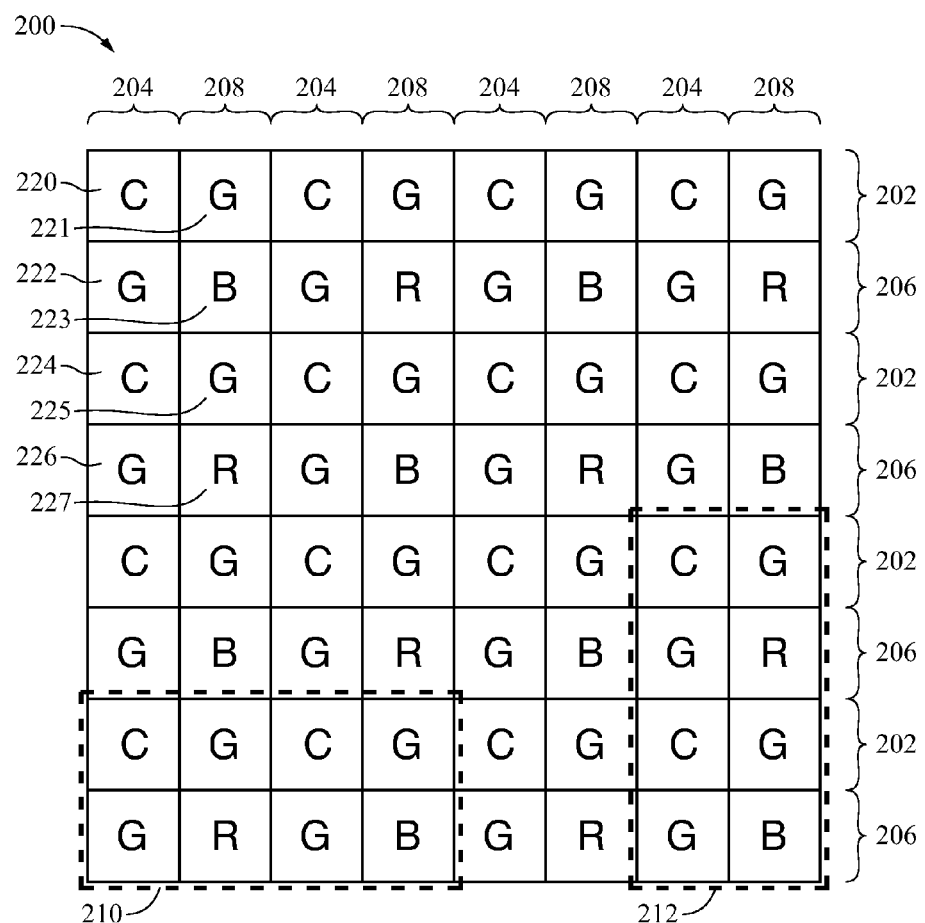
FIG. 2 is a representation of an illustrative pixel array in accordance with embodiments of the invention.

For example, FIG. 2 shows an illustrative pixel array 200. As shown in pixel array 200, "G", "R", "B", and "C" can correspond to green, red, blue, and clear pixels, respectively. In some embodiments, pixel array 200 can include one or more lines (e.g., one or more rows or columns) with clear pixels, such as "C/G" rows 202 and "C/G" columns 204. In addition, pixel array 200 can include one or more lines with only color pixels, such as "G/R/B" rows 206 and "G/R/B" columns 208. Thus, as shown in pixel array 200, the odd rows and columns of pixel array 200 can correspond to one or more lines with clear pixels, and the even rows and columns of pixel array 200 can correspond to one or more lines with only color pixels. Persons skilled in the art will appreciate that pixel array 200 is merely one representation of a suitable pixel array. Thus, any suitable pixel array with one or more clear pixels can be included in an image sensor (e.g., image sensor 110 of FIG. 1).

As shown in FIG. 2, pixel array 200 can have multiple 2×4 kernels (e.g., kernel 210) or 4×2 kernels (e.g., kernel 212). Thus, any particular kernel in pixel array 200 can include green, red, blue, and clear pixels.

Figure 3:
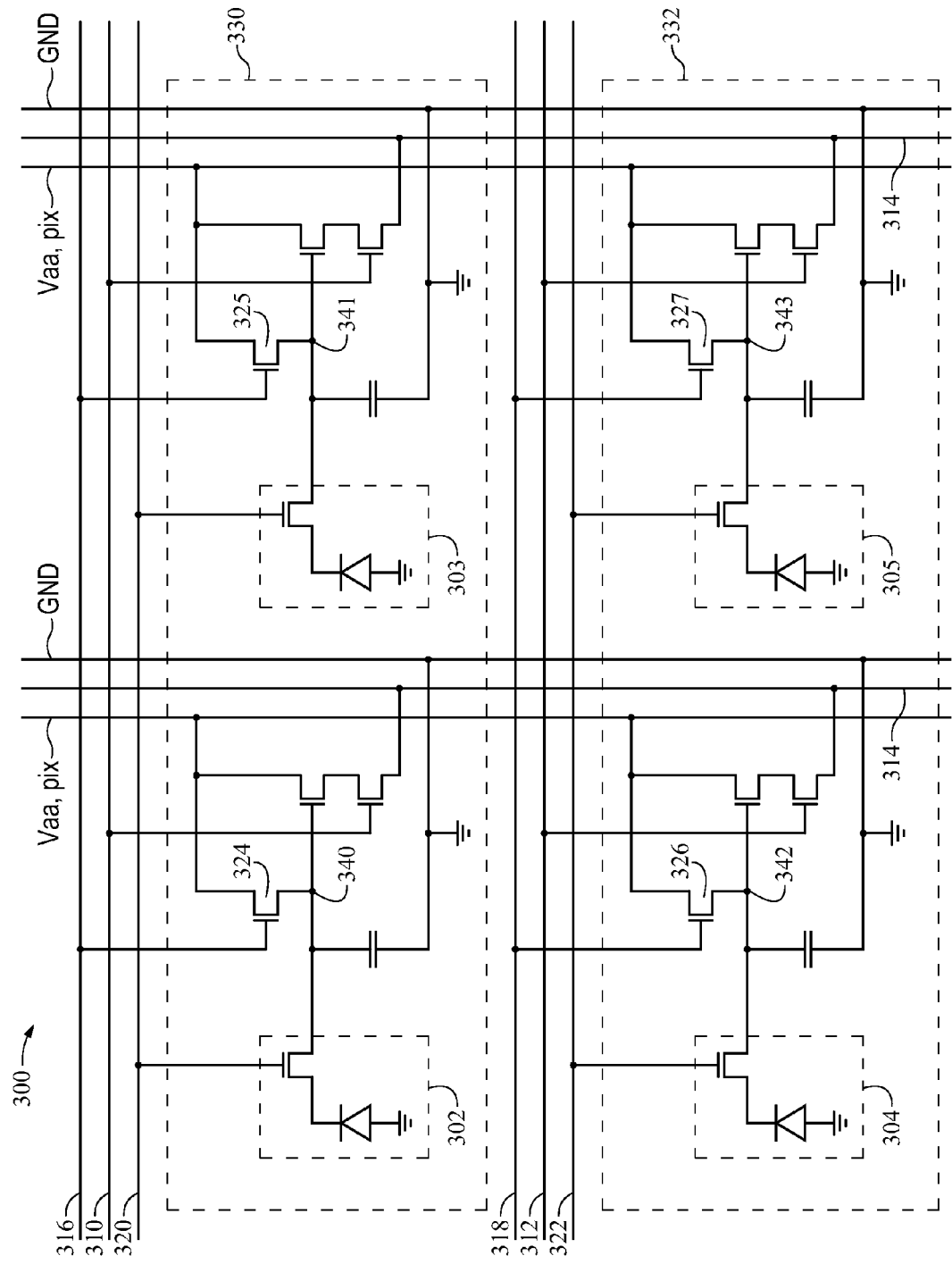
FIG. 3 is a schematic diagram of a four transistor pixel group in accordance with embodiments of the invention.

In some embodiments, pixel array 200 can include multiple transistor pixel groups. For example, FIG. 3 shows an illustrative four transistor pixel group 300. As shown in FIG. 3, transistor pixel group 300 can include four photodiodes 302-305, which can correspond to any suitable pixel group of four of pixel array 200 (FIG. 2). For example, photodiodes 302-

305 can correspond to pixels 220-223 of FIG. 2, respectively. Persons skilled in the art will appreciate that the size of transistor pixel group 300 has been reduced for the sake of simplicity. For example, a typical pixel group for pixel array 200 of FIG. 2 may correspond to a kernel of the pixel array and have a different size (e.g., 2×4).

Photodiodes 302-305 can be disposed on a substrate and can produce a charge in a doped region of the substrate. Row select lines 310 and 312 can specify which row (e.g., row 330 or row 332) of the photodiodes to sample at output line 314. In addition, reset line 316 can control the gates of reset transistors 324 and 325, and reset line 318 can control the gates of reset transistors 326 and 327. For example, when the value of a reset line (e.g., reset line 316 or 318) is turned on, one or more floating diffusion ("FD") nodes (e.g., floating diffusion nodes 340 and 341 corresponding to reset line 316 or floating diffusion nodes 342 and 343 corresponding to reset line 318) can be reset to a high potential (e.g., Vaa, pix) before charge is transferred. Thus, the values of reset lines 316 and 318 can be changed (e.g., pulsed) in order to sample each individual photodiode in rows 330 and 332, respectively.

Transfer gate lines 320 and 322 can control the amount of charge that photodiodes 302-305 can accumulate while exposed to light. For example, when transfer gate line 320 is set to low, the photodiodes in row 330 (e.g., photodiodes 302 and 303) can be exposed to light and begin to accumulate charge. Once transfer gate line 320 is set to high, however, the photodiodes stop accumulating charge and the charge collected by the photodiodes are transferred to the outputs of the photodiodes. Similarly, when transfer gate line 322 is set to low, the photodiodes in row 332 (e.g., photodiodes 304 and 305) can be exposed to light and can begin to accumulate charge. Similar to row 330, the charge accumulation may end once transfer gate line 322 is set to high.

Because transfer gate lines 320 and 322 are shared by photodiodes in the same row and different columns, an image sensor (e.g., image sensor 110) can separately control the amount of exposure for each row of photodiodes 302-305. For example, photodiodes 302 and 303 in row 330 can be exposed to light for a first exposure time and photodiodes 304 and 305 in row 332 can be exposed to light for a second exposure time.

Figure 4:
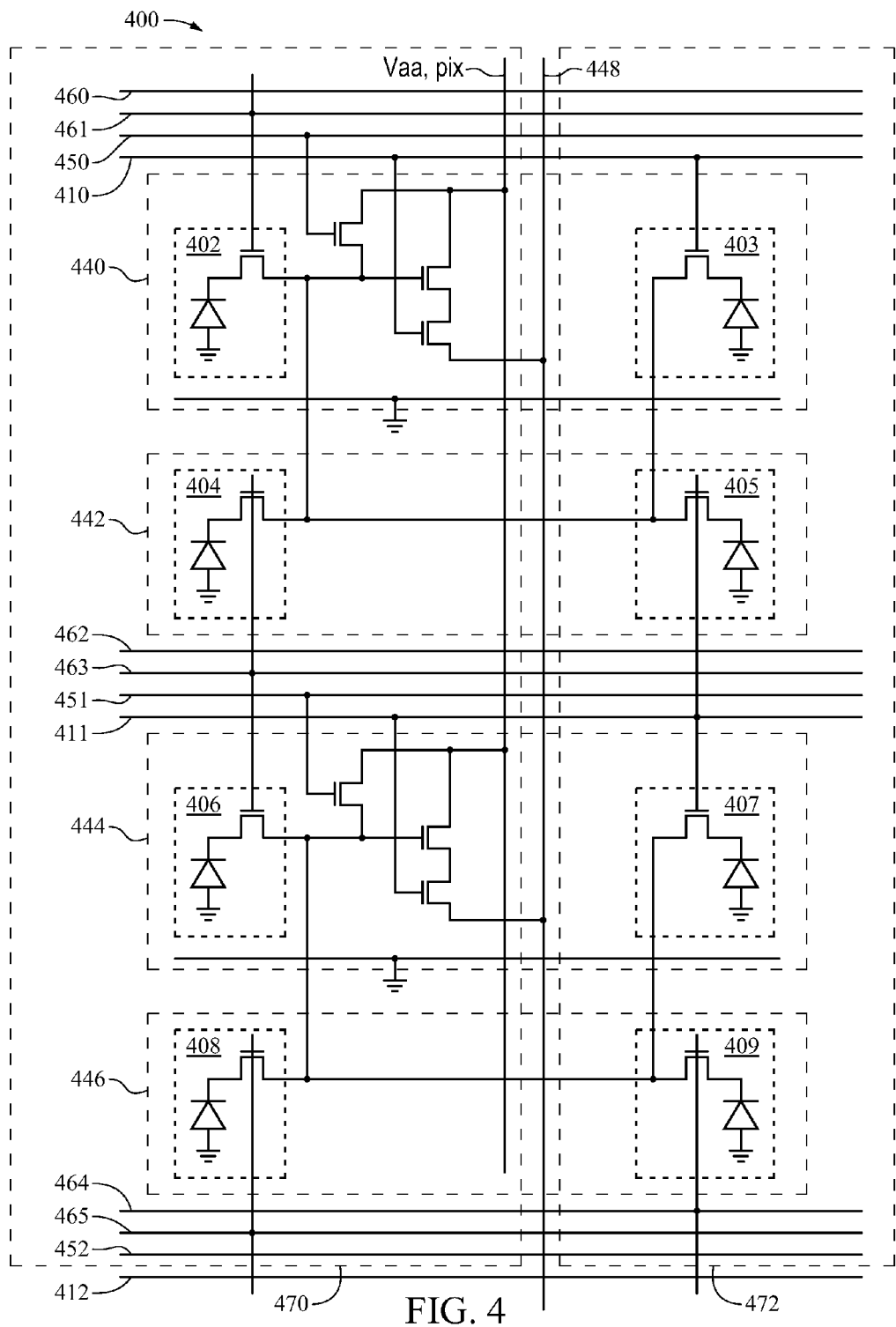
FIG. 4 is a schematic diagram of a four-way shared pixel group in accordance with embodiments of the invention.

As another example, FIG. 4 shows an illustrative four way share transistor pixel group 400. As shown in FIG. 4, transistor pixel group 400 can include four photodiodes 402-409, which can be the same as or similar to photodiodes 220-227 of FIG. 2, respectively.

Photodiodes 402-409 can be disposed on a substrate and can produce a charge in a doped region of the substrate. Row select lines 410-412 can specify which row (e.g., one row of rows 440-446) of the photodiodes to sample at output line 448. In addition, reset lines 450-452 can allow the output of each photodiode in a row to be sampled.

Transfer gate lines 460-465 can control the amount of charge that photodiodes 402-409 can accumulate while exposed to light. For example, when transfer gate line 462 is set to low, photodiodes in column 472 (e.g., photodiodes 405 and 407) can be exposed to light and begin to accumulate charge. Once transfer gate line 462 is set to high, however, the photodiodes stop accumulating charge and the charge collected by the photodiodes are transferred to the outputs of the photodiodes. Correspondingly, when transfer gate line 463 is set to low, the photodiodes in column 470 (e.g., photodiodes 404 and 406) can be exposed to light and can begin to accumulate charge. The charge accumulation of the photodiodes in column 470 may end once transfer gate line 463 is set to high.

Because transfer gate lines 460-465 are shared by photodiodes in the same column and different rows, an image sensor (e.g., image sensor 110) can separately control the amount of exposure for one or more photodiodes along each column of transistor pixel group 400. For example, photodiodes along column 470 (photodiodes 402, 404, 406, and 408) can be exposed to light for a first exposure time and photodiodes along column 472 (e.g., photodiodes 403, 405, 407, and 409) can be exposed to light for a second exposure time.

Referring back to FIG. 2, pixel array 200 can have a pixel architecture similar to one of the architectures represented in transistor pixel group 300 (FIG. 3) and transistor pixel group 400 (FIG. 4). Thus, using either pixel architecture, an image sensor (e.g., image sensor 110 of FIG. 1) can separately control the amount of exposure for pixels in alternate lines of pixel array 200 (e.g., alternate rows or columns). For example, using a pixel architecture with separate exposure control for photodiodes along rows of pixel array 200 (e.g., similar to pixel architecture of transistor pixel group 300 of FIG. 3), the image sensor can expose pixels in a first set of rows of pixel array 200 (e.g., rows 202) for a first exposure time. In addition, the image sensor can expose pixels in a second set of rows of pixel array 200 (e.g., rows 206) for a second exposure time. As another example, using a pixel architecture with separate exposure control for photodiodes along columns of pixel array 200 (e.g., similar to pixel architecture of transistor pixel group 400 of FIG. 4), the image sensor can expose pixels in a first set of columns of pixel array 200 (e.g., columns 204) for a first exposure time. In addition, the image sensor can expose pixels in a second set of columns of pixel array 200 (e.g., columns 208) for a second exposure time. Thus, in contrast to an architecture providing for separate exposure of each pixel in a pixel array, an image sensor using the described pixel architecture can have simpler control logic for the pixel array and may occupy a smaller hardware area. As a result, additional hardware space can be allocated to other components of an image system, which may lead to a better imaging response.

Referring back to FIG. 1, image sensor 110 that includes a pixel array with the described architecture (e.g., pixel array 200 of FIG. 2) can capture one or more signals corresponding to an image. After capturing the image, image sensor 110 can pass the one or more signals to auto-exposure module 120.

In response to receiving the one or more signals, auto-exposure module 120 can assign one or more different exposure times for the pixel array of image sensor 110. Auto-exposure module 120 can assign the different exposure times based on one or more suitable factors. For example, auto-exposure module 120 can assign different exposure times based on one or more characteristics of pixels that are included in each row of the pixel array. One of the characteristics of pixels can be the sensitivity of one or more pixels to light. For instance, auto-exposure module 120 may determine that clear pixels are more sensitive to light as compared to color pixels (e.g., red, green, or blue pixels). Thus, in order to avoid over-saturation and clipping of the clear pixels, auto-exposure module 120 may assign a shorter exposure time to clear pixels as compared to color pixels.

Auto-exposure module 120 can assign the one or more different exposure times by first determining that a first set of lines of the pixel array includes one or more clear pixels. In addition, auto-exposure module 120 may determine that a second set of lines of the pixel array includes only color pixels. As a result, auto-exposure module 120 can assign a first exposure time to the first set of lines based only on signals associated with the clear pixels. Additionally, auto-exposure module 120 can assign a second exposure time to the second set of lines based only on signals associated with the color pixels (e.g., red, green, and blue pixels). Because clear pixels are more sensitive to light that color pixels, the first exposure time may be shorter than the second exposure time. For example, for pixel array 200 of FIG. 2, auto-exposure module 120 can assign the first exposure time for rows 202 or columns 204 based only on signals associated with clear pixels. In addition, auto-exposure module 120 can assign the second exposure time for rows 206 or columns 208 based on signals associated with red, green, and blue pixels.

Persons skilled in the art will appreciate that auto-exposure module 120 can determine the first and second exposure times based on any combination of signals. For example, for the first exposure time, auto-exposure module 120 can determine the exposure time based on the signals associated with the clear pixels and/or the green pixels. As another example, for the second exposure time, auto-exposure module 120 can determine the exposure time based on the signals associated with the red pixels, the green pixels, the blue pixels, and/or any combination thereof. Persons skilled in the art will also appreciate that auto-exposure module 120 can also assign any suitable number of exposure times (e.g., 3, 4, 5, etc.) depending on the pixel architecture of a pixel array and/or system requirements. For example, in response to a request from image sensor 110, auto-exposure module 120 may assign a different exposure time for each line of a pixel array of image sensor 110.

After assigning the exposure times, auto-exposure module 120 can pass the one or more exposure times back to image sensor 110. Then, upon receiving the exposure times, image sensor 110 can separately expose pixels in one or more lines of a pixel array to light for a corresponding exposure time.

In response to exposing the pixels to light, image sensor 110 can determine whether the exposure was sufficient for the pixel array to capture satisfactory output signals. For example, the sufficiency of the exposure may depend on the current lighting condition. For instance, the current lighting condition may be a low light condition such that longer exposure times are required before the pixels in one or more lines of the pixel array can capture satisfactory output signals. Alternatively, the current lighting condition may be relatively bright such that the exposure times assigned by auto-exposure module 120 are sufficient to produce satisfactory output signals.

In some embodiments, in order to determine whether the exposure to light was sufficient to capture satisfactory output signals, image sensor 110 can determine if one or more signals captured by the pixel array are within a pre-determined range. For example, if image sensor 110 determines that the one or more signals are not within a pre-determined range, image sensor 110 can continue performing exposure adjustments of the pixel array. For instance, image sensor 110 can transmit the one or more signals to auto-exposure module 120 in order to continue adjusting the exposure of the pixel array.

In some embodiments, image sensor 120 may determine that only a portion of the one or more signals (e.g., only signals associated with a first set of lines or only signals associated with a second set of lines) are not within a pre-determined range. As a result, image sensor 120 can transmit only that portion of the one or more signals to auto-exposure module 120.

Thus, similar to the process described above, in response to receiving the one or more signals, auto-exposure module 120 can determine that a first set of lines of the pixel array includes one or more clear pixels. In addition, auto-exposure module 120 can determine that a second set of lines of the pixel array includes only color pixels. As a result, auto-exposure module 120 can assign a first new time as the first exposure time, where the first new time can represent the additional amount of time that pixels in the first set of lines will be exposed to light. In addition, auto-exposure module 120 can assign a second new time as the second exposure time, where the second new time can represent the additional amount of time that pixels in the second set of lines will be exposed to light.

Persons skilled in the art will appreciate that, in some cases, auto-exposure module 120 may adjust only one of the exposure times. For example, in response to receiving only signals associated with a first set of lines, auto-exposure module 120 can assign only a first new time as the first exposure time. As another example, in response to receiving only signals associated with a second set of lines, auto-exposure module 120 can assign only a second new time as the second exposure time.

The resulting one or more exposure times can be passed back to image sensor 110. Image sensor 110 can then continue to perform exposure adjustment until satisfactory output signals have been generated. For example, after one or more iterations, image sensor 110 can stop the exposure adjustment of the pixel array when one or more signals captured by the pixel array are within a pre-determined range. Thus, in response to determining that the one or more signals are within the pre-determined range, image sensor 110 can transmit first signals associated with a first set of lines and second signals associated with a second set of lines to signal reconstruction module 130. In some embodiments, in addition to these signals, image sensor 110 can pass exposure time information (e.g., one or more exposure times that were used for the first and second set of lines) to signal reconstruction module 130.

In response to receiving this information from image sensor 110, signal reconstruction module 130 can then generate an output image. Signal reconstruction module 130 can perform any other suitable processing in order to generate an output image including, for example, any suitable interpolation techniques, color processing techniques, and/or signal reconstruction techniques.

In some embodiments, signal reconstruction module 130 can obtain the true responses of one or more pixels of a pixel array by performing signal reconstruction. For example, signal reconstruction module 130 can determine a portion of first signals that are associated with a particular channel (e.g., a green channel or a clear channel). After determining the portion of first signals, signal reconstruction module 130 can perform signal reconstruction on those signals according to:

$$S_{reconstructed} = S * T_2 / T_1 \qquad (1),$$

where S can correspond to a portion of first signals associated with a green or clear channel, $T_1$ can correspond to a first exposure time used for the first set of lines (e.g., a shorter exposure time), $T_2$ can correspond to a second exposure time used for the second set of lines (e.g., a longer exposure time), and $S_{reconstructed}$ can correspond to the reconstructed portion of first signals. For example, if a portion of first signals (S) has a value of 256, the first exposure time ($T_1$) is 1 second, and the second exposure time ($T_2$) is 2 seconds, the reconstructed portion of first signals ($S_{reconstructed}$) can be proportionally adjusted to 512.

Thus, using Equation (1), signal reconstruction module 130 can obtain the true response for the clear pixels of a pixel array (e.g., pixel array 200 of FIG. 2) by performing signal reconstruction on the clear pixels in one or more rows (e.g., rows 202 of FIG. 2) or one or more columns (e.g., columns 204 of FIG. 2) of the pixel array. As another example, using Equation (1), signal reconstruction module 130 can obtain the true response for the green pixels associated with a first set of lines of a pixel array (e.g., pixel array 200 of FIG. 2) by performing signal reconstruction on the green pixels in one or more rows (e.g., rows 202 of FIG. 2) or one or more columns (e.g., columns 204 of FIG. 2) of the pixel array.

In some embodiments, signal reconstruction module 130 can combine a reconstructed portion of the first signals and a portion of second signals. For example, signal reconstruction module 130 can determine a portion of second signals that are associated with a particular channel (e.g., a green channel). After determining the portion of second signals, signal reconstruction module 130 can interpolate one or more values for the channel based on the reconstructed portion of the first signals and the portion of second signals.

For instance, for second signals in one or more rows (e.g., rows 206 of FIG. 2) or one or more columns (e.g., columns 208 of FIG. 2) of a pixel array (e.g., pixel array 200 of FIG. 2), signal reconstruction module 130 can determine a portion of the second signals corresponding to a green channel. Signal reconstruction module 130 can then merge the reconstructed portion of the first signals corresponding to the green channel with the portion of the second signals corresponding to the green channel.

Thus, by reconstructing and interpolating one or more signals, signal reconstruction module 130 can effectively extend the dynamic range of green pixels in a pixel array. In particular, because green pixels in a first set of lines have been exposed to light for a relatively short exposure time, these green pixels can capture higher quality signals for brighter areas of an image. In addition, because green pixels in a second set of lines have been exposed to light for a relatively long exposure time, these green pixels can capture higher quality signals for darker areas of an image. Thus, when signal reconstruction module 130 combines the reconstructed green pixels in the first set of lines with the green pixels in the second set of lines, a wider spectrum of brightness for an image can be captured by image system 100.

Figure 5:
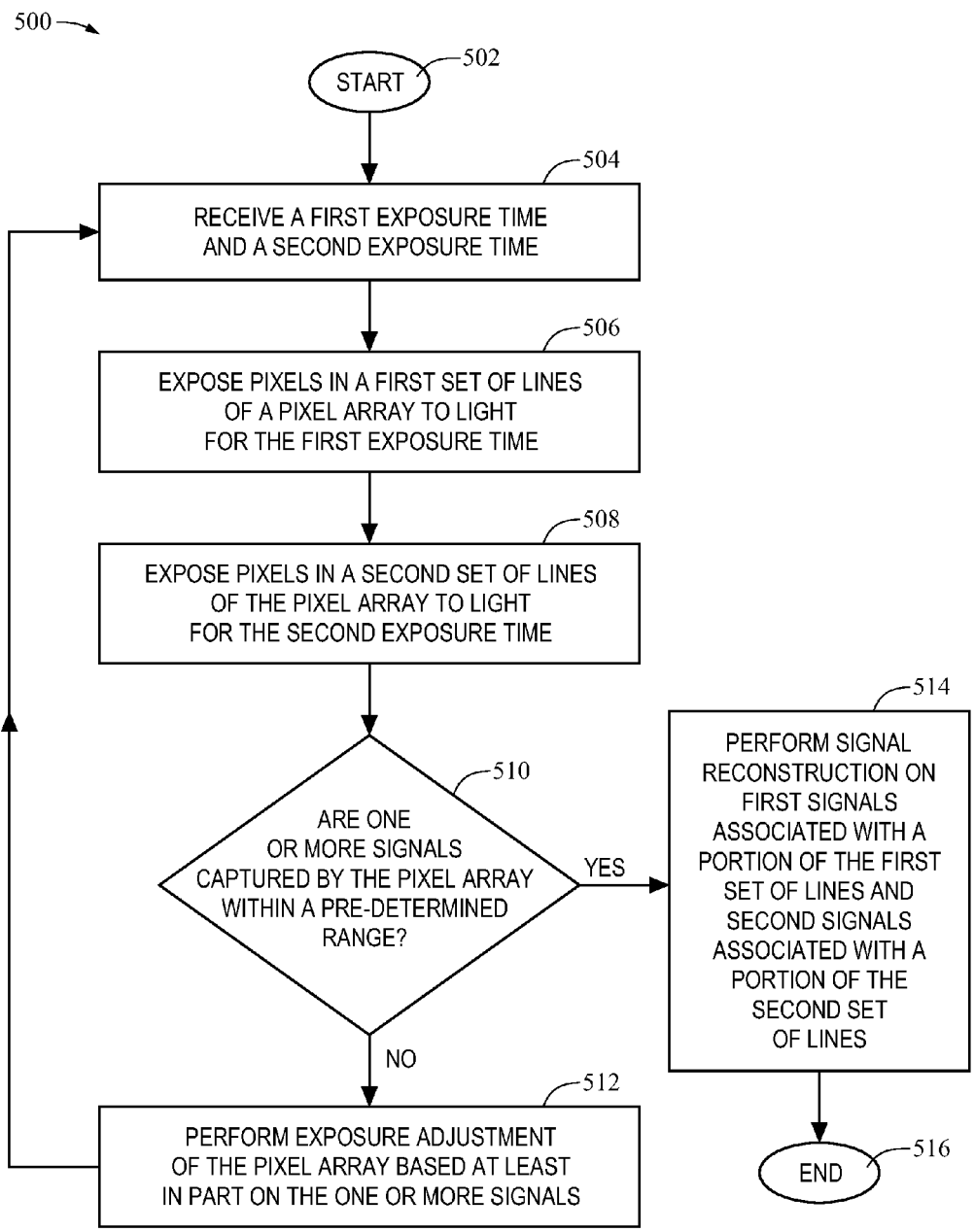
FIG. 5 is a flowchart of an illustrative process for providing adaptive exposure control and dynamic range extension in accordance with embodiments of the invention.
Figure 6:
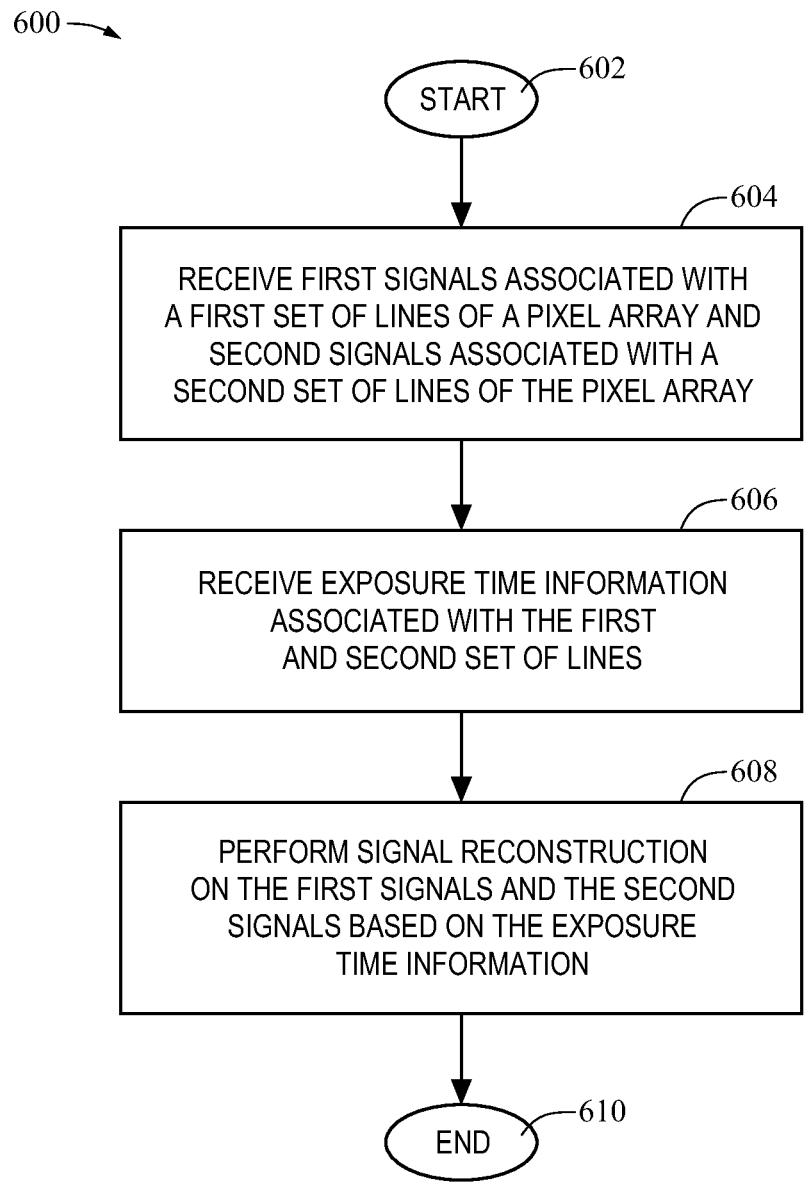
FIG. 6 is a flowchart of an illustrative process for performing signal reconstruction on signals in accordance with embodiments of the invention.
Figure 7:
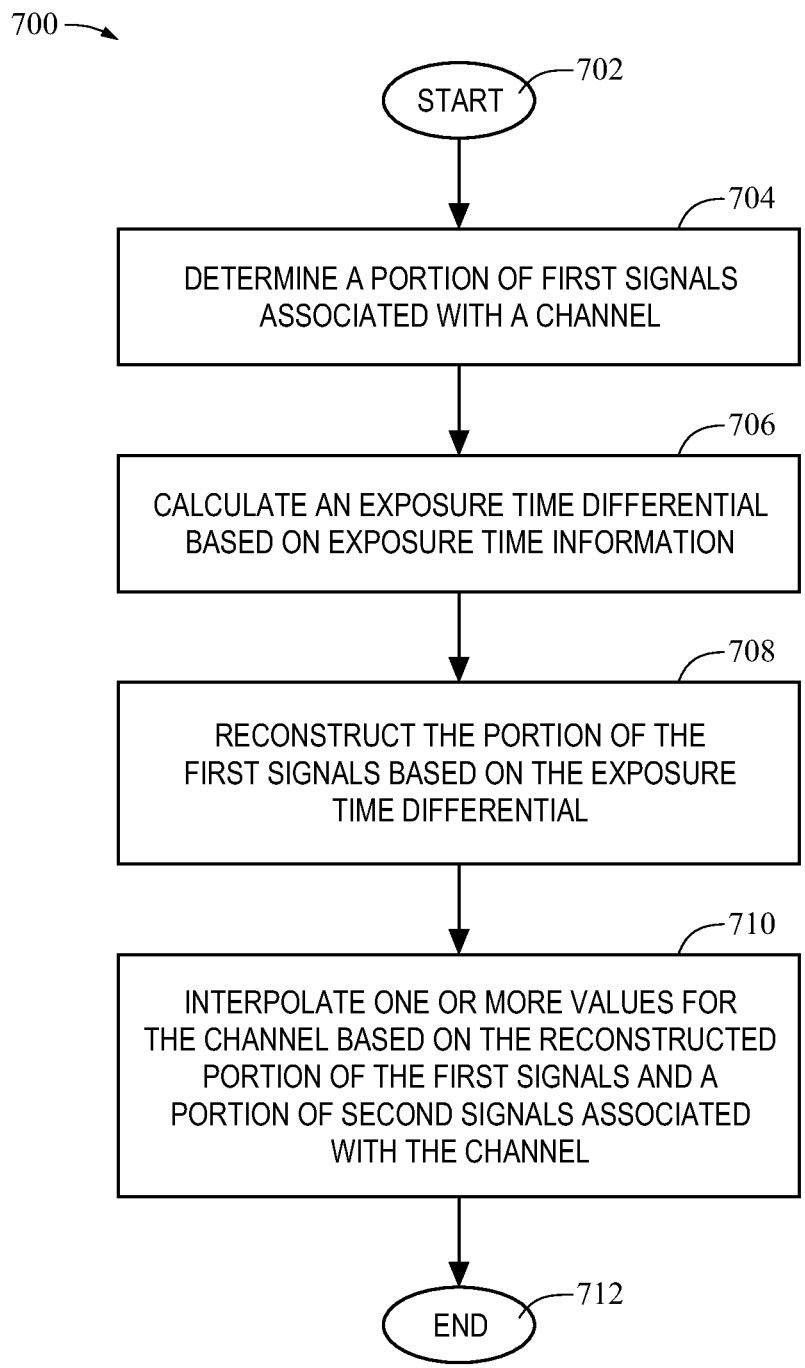
FIG. 7 is a flowchart of an illustrative process for performing interpolation on signals in accordance with embodiments of the invention.

Referring now to FIGS. 5-7, flowcharts of illustrative processes 500, 600, and 700 are shown in accordance with various embodiments of the invention. Processes 500, 600, and 700 can be executed by any suitable component (e.g., image sensor 110, auto-exposure module 120, and/or signal reconstruction module 130 of FIG. 1) of an image system (e.g., image system 100 of FIG. 1) configured in accordance with embodiments of the invention. It should be understood that processes 500, 600, and 700 are merely illustrative, and that any steps can be removed, modified, combined, or any steps may be added, without departing from the scope of the invention.

Turning first to FIG. 5, process 500 may illustrate steps for providing adaptive exposure control and dynamic range extension of an image sensor (e.g., image sensor 110 of FIG. 1). Process 500 may begin at step 502. At step 504, the image sensor can receive a first exposure time and a second exposure time. For example, the image sensor can receive first and second exposure times from auto-exposure module 120 of FIG. 1. In some cases, the first exposure time may be shorter than the second exposure time.

Then, at step 506, the image sensor can expose pixels in a first set of lines (e.g., rows 202 or columns 204 of FIG. 2) of a pixel array (e.g., pixel array 200 of FIG. 2) to light for the first exposure time. Upon being exposed to light, the pixel array can capture one or more signals corresponding to an image. In some embodiments, the first set of lines of the pixel array may include one or more clear pixels and one or more color pixels (e.g., green pixels).

Continuing to step 508, the image sensor can expose pixels in a second set of lines (e.g., rows 206 or columns 208 of FIG. 2) of the pixel array to light for the second exposure time. In some embodiments, the second set of lines of the pixel array may include one or more color pixels (e.g., any combination of green, red, and/or blue pixels).

At step 510, the image sensor can determine if one or more signals captured by the pixel array are within a pre-determined range. The image sensor can use this determination to detect if one or more pixels of the pixel array have been exposed to light for a sufficient amount of time.

If, at step 510, the image sensor determines that the one or more signals are not within a pre-determined range, process 500 can move to step 512. At step 512, the image sensor can continue to perform exposure adjustment of the pixel array based at least in part on the one or more signals. For example, the image sensor can transmit the one or more signals to an auto-exposure module (e.g., auto-exposure module 120 of FIG. 1). In response to receiving the one or more signals, the auto-exposure module can assign a first new time as the first exposure time and a second new time as the second exposure time. Process 500 may then return to step 504, where the image sensor can continue to perform exposure adjustment until satisfactory signals have been captured by the pixel array.

If, at step 510, the image sensor instead determines that the one or more signals are within a pre-determined range, process 500 can move to step 514. At step 514, a signal reconstruction module (e.g., signal reconstruction module 130 of FIG. 1) can perform signal reconstruction on first signals associated with a portion of the first set of lines and second signals associated with a portion of the second set of lines. For example, after determining that the one or more signals are within a pre-determined range, the image sensor can transmit the one or more signals to the signal reconstruction module. In response to receiving the one or more signals, the signal reconstruction module can perform signal reconstruction on first signals associated with one or more green pixels in the first set of lines and second signals associated with one or more green pixels in the second set of lines. Process 500 may then end at step 516.

Referring now to FIG. 6, a flowchart of illustrative process 600 is shown for performing signal reconstruction on one or more signals. Process 600 may be executed by a signal reconstruction module (e.g., signal reconstruction module 130 of FIG. 1). In some embodiments, process 600 may be executed as a result of performing step 514 of process 500 (FIG. 5).

Process 600 may begin at step 602. At step 604, the signal reconstruction module can receive first signals associated with a first set of lines (e.g., rows 202 or columns 204 of FIG. 2) of a pixel array (e.g., pixel array 200 of FIG. 2) and second signals associated with a second set of lines (e.g., rows 206 or columns 208 of FIG. 2) of the pixel array. For example, the signal reconstruction module can receive the first and second signals from an image sensor (e.g., image sensor 110 of FIG. 1).

Then, at step 606, the signal reconstruction module can receive exposure time information associated with the first and second set of lines. For example, the signal reconstruction module can receive a first exposure time associated with the first set of lines and a second exposure time associated with the second set of lines from the image sensor.

Continuing to step 608, the signal reconstruction module can perform signal reconstruction on the first signals and the second signals based on the exposure time information. After performing the signal reconstruction, process 600 may end at step 610.

Turning now to FIG. 7, a flowchart of illustrative process 700 is shown for performing interpolation on one or more signals. Process 700 may be executed by a signal reconstruction module (e.g., signal reconstruction module 130 of FIG. 1). In some embodiments, process 600 may be executed as a result of performing step 608 of process 600 (FIG. 6).

Process 700 may start at step 702. Then, at step 704, the signal reconstruction module can determine a portion of first signals associated with a channel. For example, the first signals may correspond to signals captured by a first set of lines (e.g., rows 202 or columns 204 of FIG. 2) of a pixel array (e.g., pixel array 200 of FIG. 2). Thus, the signal reconstruction module can determine a portion of first signals associated with a clear channel and/or a green channel.

Continuing to step 706, the signal reconstruction module can calculate an exposure time differential based on exposure time information. For example, the signal reconstruction module can calculate an exposure time differential by calculating a ratio between a first exposure time and a second exposure time. For instance, the first exposure time may correspond to the amount of time that pixels in a first set of lines of a pixel array have been exposed to light. Similarly, the second exposure time may correspond to the amount of time that pixels in a second set of lines of a pixel array have been exposed to light. After calculating the exposure time differential, process 700 may move to step 708.

At step 708, the signal reconstruction module can reconstruct the portion of the first signals based on the exposure time differential. For example, the signal reconstruction module can multiply the portion of first signals by the exposure time differential. In some embodiments, the calculations performed by the signal reconstruction module in steps 706 and 708 may be represented by Equation (1). As a result of reconstructing the portion of the first signals, the signal reconstruction module can obtain the true response for that portion of the first signals (e.g., clear and/or green pixels in the first set of lines).

Then, at step 710, the signal reconstruction module can interpolate one or more values for the channel based on the reconstructed portion of the first signals and a portion of second signals associated with the channel. For example, the second signals may correspond to a second set of lines (e.g., rows 206 or columns 208 of FIG. 2) of a pixel array (e.g., pixel array 200 of FIG. 2). Thus, the signal reconstruction module can determine a portion of the second signals associated with a green channel. After determining the portion of the second signals, the signal reconstruction module can interpolate (e.g., combine or merge) the reconstructed portion of the first signals associated with the green channel and the portion of the second signals. In such a way, the signal reconstruction module can effectively extend the dynamic range of the green pixels. Process 700 may then end at step 712.

In conclusion, systems and methods are disclosed for providing adaptive exposure control and dynamic range extension of image sensors. An image sensor can include a pixel array with one or more clear pixels. Although the one or more clear pixels can improve the imaging performance of an image sensor under low light conditions, the sensitivity of the clear pixels can cause these pixels to reach saturation much faster than color pixels (e.g., green, red, and/or blue pixels) of the pixel array.

Thus, an image system is provided that can separately control the amount of time that pixels in different lines of a pixel array are exposed to light. For such an implementation, if the clear pixels are located in odd lines of a pixel array and color pixels are located in even lines of a pixel array, the image sensor can expose the clear pixels for a first exposure time and the color pixels for a second exposure time. For instance, using an auto-exposure module, the image sensor can adjust the exposure times to prevent over-saturation of the clear pixels, while also providing a longer exposure time for most of the color pixels.

Moreover, in contrast to systems that provide for separate exposures of individual pixels, the image sensor can take advantage of existing pixel architectures where clear pixels are configured to share a transfer gate line with one or more color pixels. In this way, hardware resources can be conserved because a separate control line is not required for the clear pixels.

In some embodiments, the dynamic range of the image system can be extended through a reconstruction and interpolation process. For example, green pixels in a first set of lines of a pixel array may be paired with clear pixels, while green pixels in a second set of lines of the pixel array may be paired with other color pixels. Correspondingly, green pixels in the first set of lines may be exposed to light for a relatively short exposure time, whereas green pixels in the second set of lines may be exposed to light for a relatively long exposure time. Thus, by merging signals associated with these two different types of green pixels, a signal reconstruction module of the image system can capture a wide spectrum of brightness for an image because high quality signals can be obtained for both bright and dark areas of the image.

In some embodiments, the signal reconstruction module can extend the dynamic range of one or more green pixels of a pixel array by first reconstructing a portion of signals in a first set of lines of the pixel array. Then, the signal reconstruction module can combine the reconstructed portion of signals in the first set of lines and a portion of signals in a second set of lines to generate one or more values corresponding to a green channel.

The described embodiments of the invention are presented for the purpose of illustration and not of limitation.

What is claimed is:

1. A method for extending a dynamic range of signals, the method comprising:
   receiving a plurality of first signals associated with a first set of lines of a pixel array and a plurality of second signals associated with a second set of lines of the pixel array;
   receiving exposure time information associated with the first and second set of lines; and
   performing signal reconstruction on the plurality of first signals and the plurality of second signals based on the exposure time information, wherein the performing the signal reconstruction further comprises:
   determining a portion of the plurality of first signals associated with a single channel;
   calculating an exposure time differential based on the exposure time information; and
   reconstructing the portion of the plurality of first signals based on the exposure time differential.

2. The method of claim 1, wherein the exposure time information comprises a first exposure time associated with the plurality of first signals, and a second exposure time associated with the plurality of second signals.

3. The method of claim 2, wherein the first exposure time is shorter than the second exposure time.

4. The method of claim 2, wherein the plurality of first signals comprises one or more clear pixels and first green pixels, and the plurality of second signals comprises one or more second green pixels, blue pixels, and red pixels.

5. The method of claim 2, wherein the calculating the exposure time differential comprises calculating a ratio between the first exposure time and the second exposure time.

6. The method of claim 1, wherein the channel is one of a green channel and a clear channel.

7. The method of claim 1, wherein the reconstructing the portion of the plurality of the first signals comprises multiplying the portion of the plurality of first signals associated with the single channel by the exposure time differential.

8. The method of claim 1, further comprising interpolating one or more values for the single channel based on the reconstructed portion of the plurality of first signals and a portion of the plurality of second signals associated with the single channel.

* * * * *